United States Patent
Xu et al.

(10) Patent No.: US 7,583,857 B2
(45) Date of Patent: Sep. 1, 2009

(54) SYSTEM AND METHOD FOR SALIENT REGION FEATURE BASED 3D MULTI MODALITY REGISTRATION OF MEDICAL IMAGES

(75) Inventors: Chenyang Xu, Allentown, NJ (US); Dieter Hahn, Erlangen (DE); Yiyong Sun, Lawrenceville, NJ (US); Frank Sauer, Princeton, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 650 days.

(21) Appl. No.: 11/380,673

(22) Filed: Apr. 28, 2006

(65) Prior Publication Data
US 2007/0047840 A1    Mar. 1, 2007

Related U.S. Application Data

(60) Provisional application No. 60/710,834, filed on Aug. 24, 2005.

(51) Int. Cl.
    G06K 9/32    (2006.01)
(52) U.S. Cl. .................. 382/294; 382/274; 382/282; 382/284; 358/520; 358/540; 358/450
(58) Field of Classification Search .......... 382/274, 382/275, 282, 284, 294; 358/515, 516, 520, 358/540, 450
See application file for complete search history.

(56) References Cited

U.S. PATENT DOCUMENTS

| | | | |
|---|---|---|---|
| 4,945,478 A | | 7/1990 | Merickel et al. |
| 5,297,061 A | * | 3/1994 | Dementhon et al. .......... 345/180 |
| 5,629,854 A | * | 5/1997 | Schulte ...................... 701/207 |
| 6,556,704 B1 | * | 4/2003 | Chen ........................ 382/154 |
| 6,750,974 B2 | * | 6/2004 | Svetkoff et al. ............. 356/602 |
| 2002/0054699 A1 | | 5/2002 | Roesch et al. |

FOREIGN PATENT DOCUMENTS

WO    02/23477 A2    3/2002

OTHER PUBLICATIONS

Holden et al., "Voxel Similarity Measures for 3-D Serial MR Brain Image Registration", IEEE Trans. on Med. Imaging, vol. 19, No. 2, Feb. 2000, pp. 94-102.

* cited by examiner

*Primary Examiner*—Yosef Kassa

(57) ABSTRACT

A method for aligning a pair of images includes providing a pair of images, identifying salient feature regions in both a first image and a second image, wherein each region is associated with a spatial scale, representing feature regions by a center point of each region, registering the feature points of one image with the feature points of the other image based on local intensities, ordering said feature pairs by a similarity measure, and optimizing a joint correspondence set of feature pairs by refining the center points to sub-pixel accuracy.

25 Claims, 7 Drawing Sheets

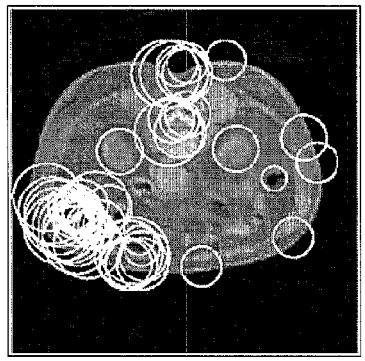
(a)
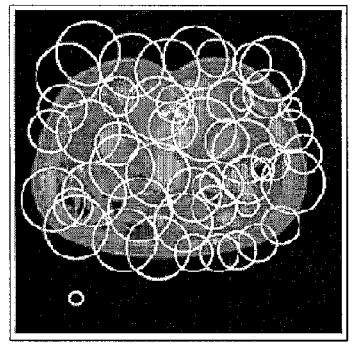
(b)
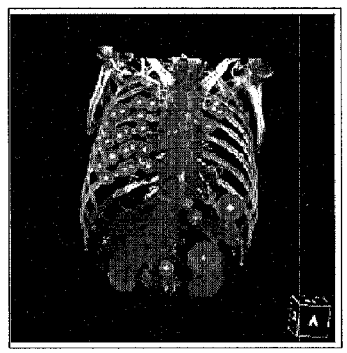
(c)
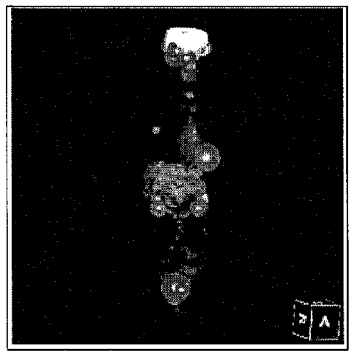
(d)
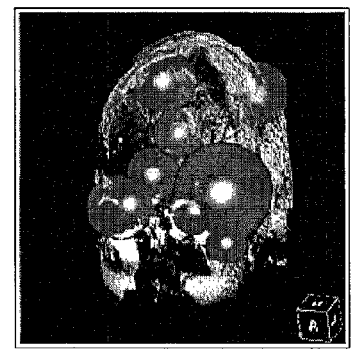
(e)
FIG. 1

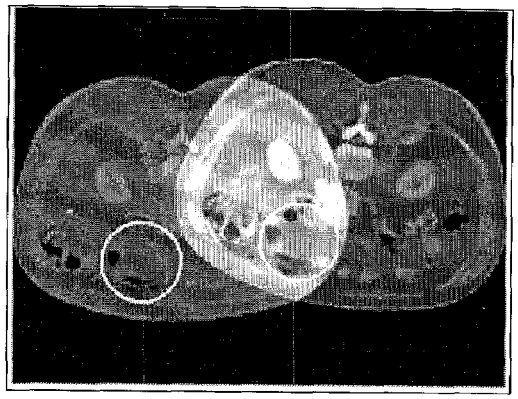
(a)
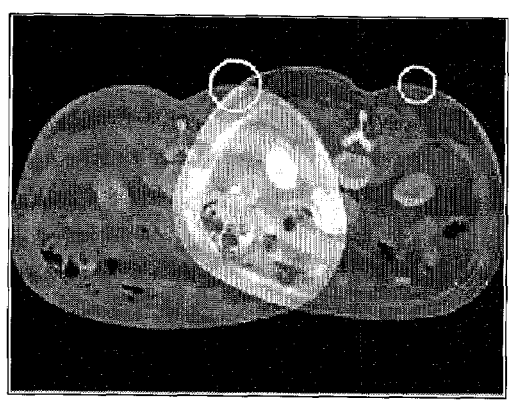
(c)
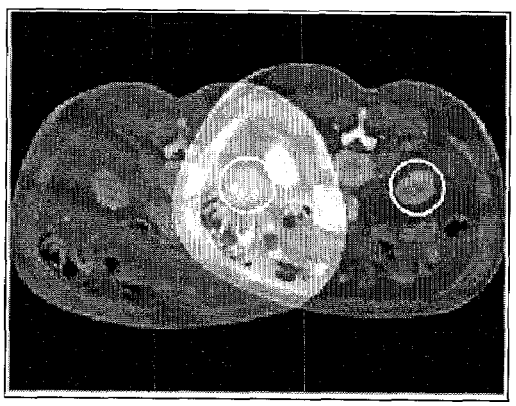
(b)
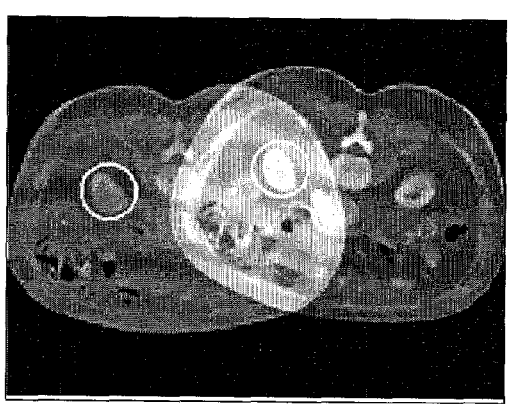
(d)
FIG. 2

| PET-CT Distances | $x$ | $y$ | $z$ |
|---|---|---|---|
| Lung right apex | -0.54 ± 0.70 | 0.41 ± 0.92 | -1.21 ± 1.84 |
| Lung left apex | 0.06 ± 0.38 | -0.11 ± 0.68 | -1.29 ± 2.18 |
| Cardiac apex | 0.88 ± 0.80 | 1.34 ± 0.60 | 0.48 ± 1.86 |
| Liver round end | 0.47 ± 0.77 | 0.84 ± 0.72 | 1.06 ± 1.83 |
| Upper right renal end | -0.65 ± 0.78 | -0.04 ± 0.80 | 0.50 ± 2.74 |
| Upper left renal end | 0.23 ± 0.74 | 0.01 ± 0.77 | 0.35 ± 1.75 |
| Lower right renal end | 0.12 ± 0.46 | 0.47 ± 1.30 | 1.92 ± 2.71 |
| Lower left renal end | -0.47 ± 0.77 | 0.86 ± 1.50 | 1.61 ± 1.71 |

(a)

| CT-CT Distances | $x$ | $y$ | $z$ |
|---|---|---|---|
| Lung right apex | -0.28 ± 0.39 | 0.16 ± 0.13 | -0.16 ± 0.18 |
| Lung left apex | -0.25 ± 0.41 | 0.21 ± 0.24 | -0.06 ± 0.14 |
| Cardiac apex | -0.20 ± 0.51 | 0.52 ± 0.41 | 0.22 ± 0.31 |
| Liver round end | 0.11 ± 0.29 | 0.00 ± 0.73 | 0.37 ± 0.93 |
| Upper right renal end | -0.30 ± 0.42 | -0.12 ± 0.25 | 0.21 ± 1.24 |
| Upper left renal end | 0.01 ± 0.33 | 0.28 ± 0.44 | 0.15 ± 0.67 |
| Lower right renal end | -0.5 ± 0.46 | 0.02 ± 0.87 | 0.89 ± 0.74 |
| Lower left renal end | 0.01 ± 0.23 | -0.14 ± 0.40 | 0.46 ± 0.44 |

(b)

| SPECT-CT Distances | $x$ | $y$ | $z$ |
|---|---|---|---|
| Spine | 0.07 ± 0.30 | 0.09 ± 0.23 | -0.04 ± 0.22 |
| Kidneys | 0.01 ± 0.26 | 0.13 ± 0.50 | 0.03 ± 0.21 |
| Others | 0.04 ± 0.06 | 0.27 ± 0.37 | 0.13 ± 0.22 |

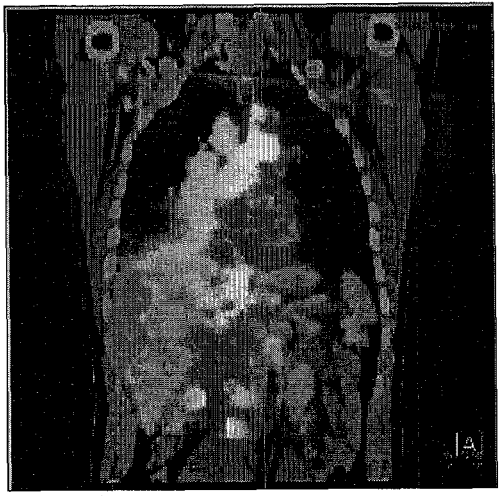
(a)
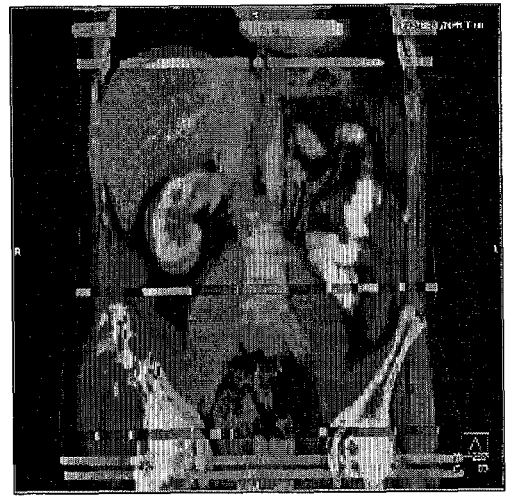
(b)
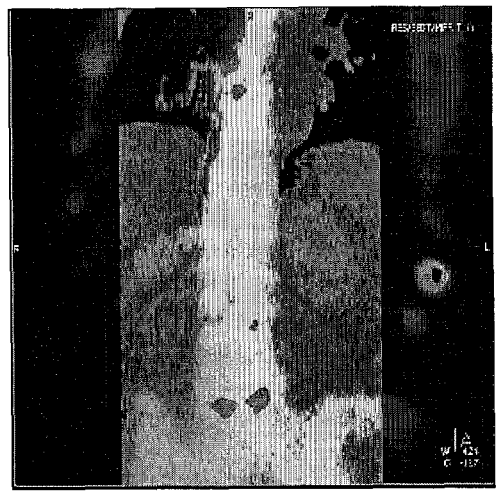
(c)
FIG. 5

SYSTEM AND METHOD FOR SALIENT REGION FEATURE BASED 3D MULTI MODALITY REGISTRATION OF MEDICAL IMAGES

CROSS REFERENCE TO RELATED UNITED STATES APPLICATION

This application claims priority from "Method and System for Robust Salient Region Based Registration of 3D Medical Images", U.S. Provisional Application No. 60/710,834 of Xu, et al., filed Aug. 24, 205, the contents of which are incorporated herein by reference.

TECHNICAL FIELD

This invention is directed to registration techniques for 3D digital medical images.

DISCUSSION OF THE RELATED ART

In medical image processing, registration has become a fundamental task that yields a mapping between the spatial positioning of two or more images and can be used in a variety of applications. The main requirement for the alignment transformation is to optimally overlay corresponding image content. Existing registration approaches can be classified as feature based (e.g. landmarks, edges, markers), intensity based, or hybrid methods that combine aspects of the previous two methods. Landmark based methods can lead to poor alignment in regions away from the features. Approaches that are based only on image intensities can become trapped in a local optimum that is far from the ideal solution due to the nature of the optimization process. Hybrid techniques make use of a combination of multiple such properties and may be preferred especially for the registration of images from different modalities, where image intensity or geometric information alone does not provide an accurate measurement basis. For instance, mutual information paired with an additional information channel that consists of region labeling information may improve the registration results of MR and PET images. Hybrid registration techniques are known for instance in low-contrast abdominal regions, blood plasma gel electrophoresis or protein imaging, etc. Other fields of application are, for example, the creation of atlases or normative databases that are suitable for image or object analyses, intra- or inter-patient studies that allow physicians to gain knowledge of the development of diseases, or time based follow-up studies during cancer therapy.

The use of different imaging systems for the same subject can achieve more information but on the other hand requires multi-modality registration techniques for proper interpretation. The addition of complementary information is facilitated by various medical imaging systems that can be coarsely divided into two major categories: anatomical imaging to extract morphological information (e.g. X-Ray, Computed Tomography (CT), Magnetic Resonance Imaging (MRI), Ultrasound (US)), and functional imaging that visualizes information on the metabolism of the underlying anatomy (e.g. Single Photon Emission Computed Tomography (SPECT), Positron Emission Tomography (PET), functional MRI (fMRI)). In multi-modality image registration, the combination of different types of images is advantageous for the physician. For instance, CT images feature good spatial resolution, whereas PET images depict the functionality of the underlying tissue. The lack of functional information in the CT images can therefore be compensated by a fusion with corresponding PET images that on their part lack of spatial resolution.

SUMMARY OF THE INVENTION

Exemplary embodiments of the invention as described herein generally include methods and systems for a registration approach that automatically extracts 3D regions from two images, finds corresponding pairs between them and establishes a rigid registration transform in order to visualize the fused results in a medical application Scale, translation and rotation invariance properties of those intrinsic features are adapted to 3D to estimate a transform between underlying mono- or multi-modality 3D medical images. Methods according to embodiments of the invention combine advantageous aspects of both feature- and intensity-based approaches and include an automatic extraction of a set of 3D salient region features on each image, an estimation of a correspondence set, and its sub-pixel accurate refinement that includes the elimination of outliers. A region-growing based approach is used for the extraction of 3D salient region features, which reduces feature clustering and the corresponding search space complexity.

An algorithm according to an embodiment of the invention features fast clustering of salient regions by exploiting a kD-tree structure, and uses a local intensity driven registration of 3D salient feature regions to improve optimization. Additional features of an algorithm according to an embodiment of the invention include the use of an iterative closest point algorithm on the centroids of two pairs of saliency regions to perform an initial pose estimate and the local refinement of the centroids using local intensity based registration to achieve sub-pixel accuracy.

An algorithm according to an embodiment of the invention is a fully automatic, robust, multi-modality rigid image registration algorithm, which can successfully register 3D images under arbitrary poses. Images are modeled by a variety of scale-invariant 3D features, subject to geometric configuration constraints. Joint correspondences between multiple 3D salient feature pairs are pursued, fully exploiting the relative configuration constraints between features on a same image. Compared to the correspondences between individual feature pairs, the strict geometric constraints imposed by the joint correspondences make the false matches very unlikely. A transform that is estimated from the joint correspondence set converges to a global optimum as joint correspondences are incrementally added until the global image alignment quality cannot be further improved by adding new pairs. This is achieved by a suitable convergence criterion.

According to an aspect of the invention, there is provided a method for aligning a pair of images comprising the steps of providing a pair of images with a first image and a second image, wherein said images comprise a plurality of intensities corresponding to a domain of pixels in a 3-dimensional space, identifying salient feature regions in both the first image and the second image, wherein each region is associated with a spatial scale, representing feature regions by a center point of each region, registering the feature points of one image with the feature points of the other image based on local intensities, ordering said feature pairs by a similarity measure, and optimizing a joint correspondence set of feature pairs by refining the center points to sub-pixel accuracy.

According to a further aspect of the invention, the method comprises representing salient feature region center points for one image in a kD-tree, querying said kD-tree for each feature to find a set of nearest neighbor features, and removing from said tree those nearest neighbor features with a lower saliency value and that have a center point within the scale of said each feature, wherein a substantially uniform distribution of salient feature regions in said image is achieved.

According to a further aspect of the invention, the spatial scale is a radius of a sphere comprising said feature region.

According to a further aspect of the invention, the kD-tree uses image pixel indices of said salient feature region center points as leaves, and wherein a distance from a feature region to a nearest neighbor feature region is in image index units.

According to a further aspect of the invention, registering the feature points based on local intensities further comprises estimating an initial registration using an iterative closest point transformation between said first image and said second image, transforming all features of said second image into a coordinate space of said first image, storing said transformed features in a kD-tree, and querying said tree for each feature in said first image to select those nearest neighbor features in said second image based on a predefined selection criteria, and testing said selected feature pairs of features in said first image and said second image for translation invariance, rotation invariance, and a global image similarity measure, wherein said selected feature pairs are ordered by their global image similarity measure values.

According to a further aspect of the invention, the iterative closest point transformation minimizes a mean square error between each set of feature points.

According to a further aspect of the invention, testing said translation invariance comprises estimating $\hat{\Theta}_{i,j}^T = p_i - p_j$, with $p_i$ and $p_j$ being center position coordinates of the $i^{th}$ first image and $j^{th}$ second image features in physical space.

According to a further aspect of the invention, testing said rotation invariance comprises estimating $$\hat{\Theta}_{i,j}^R = \underset{\Theta^R}{\operatorname{argmax}} ECC\left(f_i, f_j^{T_{\Theta^R}}\right),$$

wherein $(f_i, f_j)$ representing said pair of the features in said first image and said second image, respectively, $$ECC(f_i, f_j) = 2 - \frac{2H(f_i, f_j)}{H(f_i) + H(f_j)},$$

wherein H represents an entropy with respect to image intensity values within a spherical neighborhood feature region $f_s$ around a voxel position x with said spatial scale s defined as $$H_D(s,x) = -\int_{R_s} p(i,s,x) \log_2 p(i,s,x) di,$$

wherein p(i, s, x) is a probability density function for the image intensity values i contained in f, wherein $H(f_i, f_j)$ is a joint differential entropy defined as $$H(f_i, f_j) = -\int_{f_i, f_j} p(f_i, f_j) \log_2 p(f_i, f_j) dIdJ,$$

wherein $p(f_i, f_j)$ is a joint probability density of the image intensities in feature regions $f_i$ and $f_j$, and I and J take on values in the set of possible intensity values in said first and second images, respectively.

According to a further aspect of the invention, testing said global image similarity measure comprises estimating $$L_{global}(c_{i,j}) = ECC\left(I_r, I_t^{T_{\hat{\Theta}_{i,j}}}\right),$$

wherein $I_r$ represent said first image, $$I_t^{T_{\hat{\Theta}_{i,j}}}$$

represents said transformation of said second image onto the coordinate space of said first image, $$ECC\left(I_r, I_t^{T_{\hat{\Theta}_{i,j}}}\right) = 2 - \frac{2H\left(I_r, I_t^{T_{\hat{\Theta}_{i,j}}}\right)}{H(I_{ri}) + H\left(I_t^{T_{\Theta^R}}\right)},$$

wherein H represents an entropy with respect to image intensity values within one of said images around a voxel position x with said spatial scale s defined as $$H(s,x) = -\int_{R_s} p(i,s,x) \log_2 p(i,s,x) di,$$

wherein p(i, s, x) is a probability density function for the image intensity values i contained in I, wherein H $$H\left(I_r, I_t^{T_{\hat{\Theta}_{i,j}}}\right),$$

is a joint differential entropy defined as $$H\left(I_r, I_t^{T_{\hat{\Theta}_{i,j}}}\right) = -\int_{I_r, I_t^{T_{\hat{\Theta}_{i,j}}}} p\left(I_r, I_t^{T_{\hat{\Theta}_{i,j}}}\right) \log_2 p\left(I_r, I_t^{T_{\hat{\Theta}_{i,j}}}\right) dIdJ,$$

wherein $$p\left(I_r, I_t^{T_{\hat{\Theta}_{i,j}}}\right)$$

is a joint probability density of the image intensities in images $I_r$ and $$I_t^{T_{\hat{\Theta}_{i,j}}},$$

and I and J take on values in the set of possible intensity values in said first and second images, respectively, and wherein $L_{global}$ is evaluated on the entire overlap domain of said first and second images.

According to a further aspect of the invention, optimizing a joint correspondence set of feature pairs further comprises initializing said joint correspondence set with a feature pair that is most similar according to said similarity measure, estimating said similarity measure for a union of said joint correspondence set with each feature pair not already included in said joint correspondence set, selecting a feature pair that maximizes the similarity measure of said union, wherein if the similarity measure of the union of said maximizing feature pair with said joint correspondence set is greater than the similarity measure of the joint correspondence set, said maximizing feature pair is registered with a sub-pixel accuracy with a local rigid transformation and is added to said joint correspondence set.

According to a further aspect of the invention, the similarity measure is maximized by using an iterative closest point procedure to calculate a registration transformation between feature pairs.

According to a further aspect of the invention, if the similarity measure of the union of said maximizing feature pair with said joint correspondence set is less than or equal to the similarity measure of the joint correspondence set, providing a registration transformation computed from the registration transformation between feature pairs that maximizes said similarity measure.

According to another aspect of the invention, there is provided a program storage device readable by a computer, tangibly embodying a program of instructions executable by the computer to perform the method steps for aligning a pair of images.

BRIEF DESCRIPTION OF THE DRAWINGS

FIGS. 1(a)-(e) depict exemplary sets of salient feature regions, according to embodiments of the invention.

FIGS. 2(a)-(d) show a slice of a CT volume (left part) that has been translated, rotated and overlaid onto the original slice, according to an embodiment of the invention.

FIGS. 4(a)-(c) are tables displaying overall measured distances for, respectively, the PET-CT, CT-CT, and SPECT-CT volume pairs in x, y and z-direction given in cm, along with the standard deviation, according to an embodiment of the invention.

FIGS. 5(a)-(5) depict three slices from fused registered result images from, respectively, a PET-CT image pair, a CT-CT image pair with intensity artifacts, and a SPECT-CT image pair, acquired using an algorithm according to an embodiment of the invention.

DETAILED DESCRIPTION OF THE PREFERRED EMBODIMENTS

Figure 3:
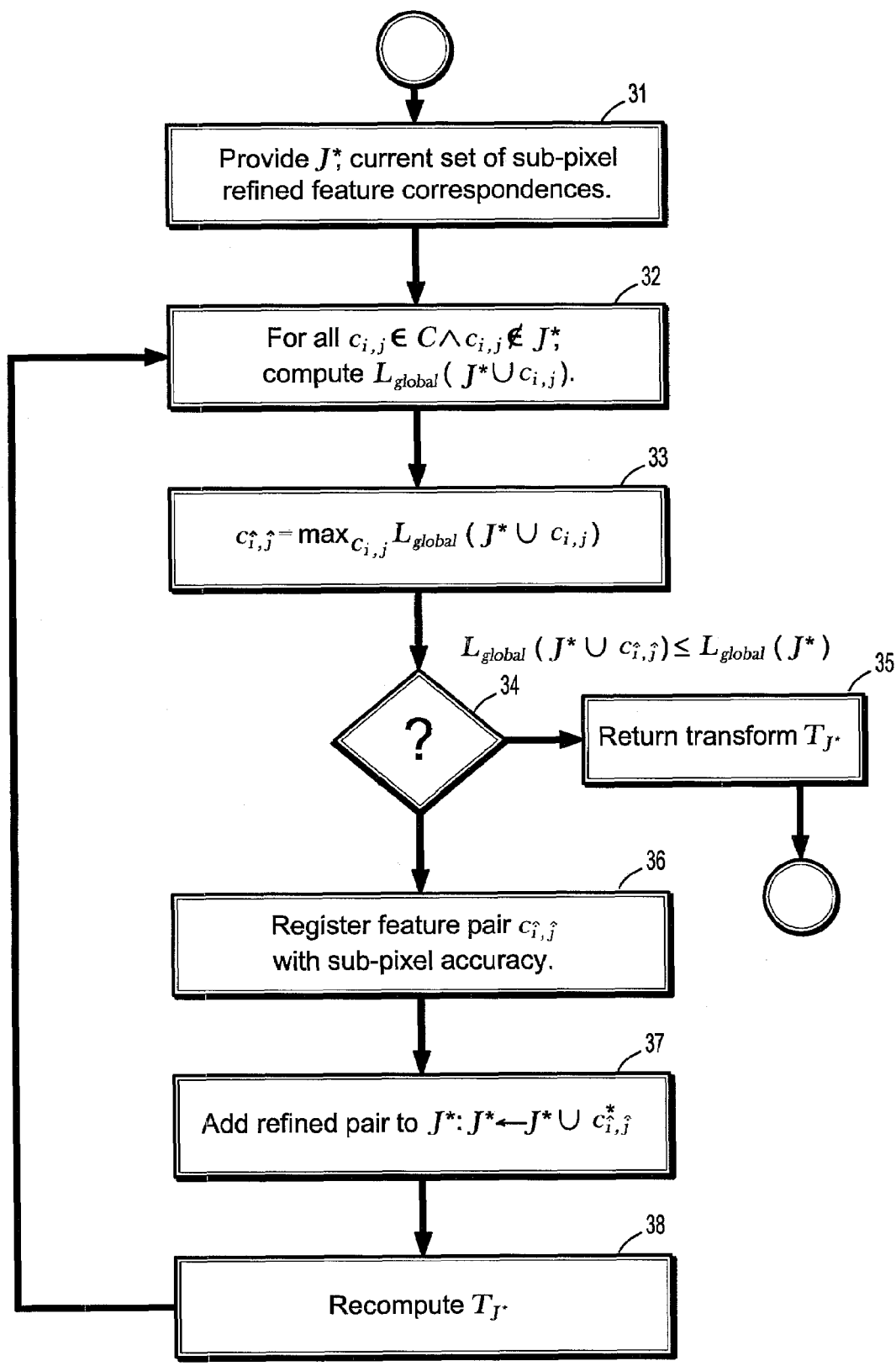
FIG. 3 depicts a flow chart of an EM-type algorithm for the optimization of both the joint correspondence set and the registration transform, according to an embodiment of the invention.

Exemplary embodiments of the invention as described herein generally include systems and methods for configural matching of automatically extracted scale-, rotation- and translation-invariant 3D salient region features. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, the methods of the inventions are not limited to such images, and can be applied to images of any dimension, e.g. a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

Figure 6:
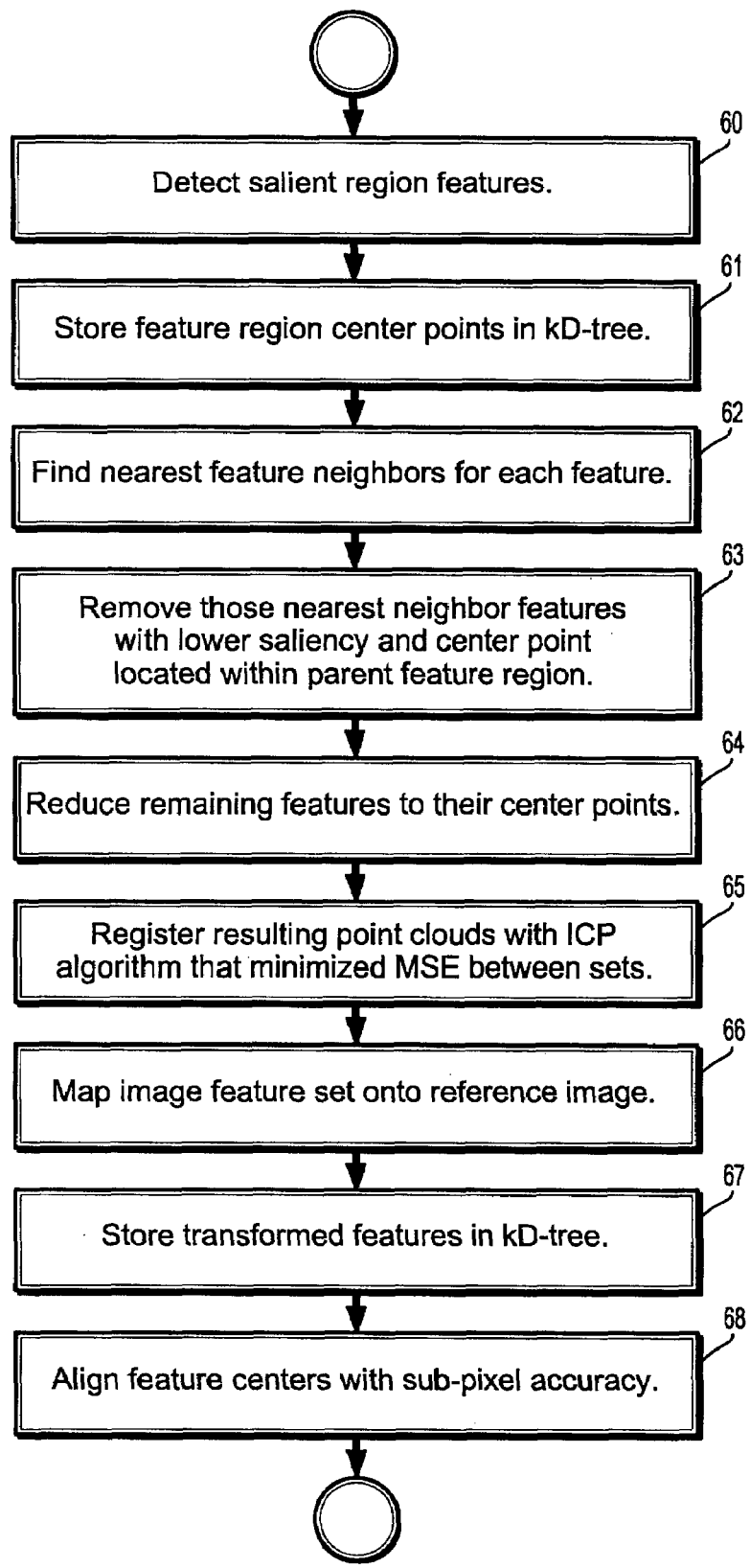
FIG. 6 is a flow chart of a 3D registration process according to an embodiment of the invention.

According to an embodiment of the invention, a saliency description is used to automatically extract features from 3D images. A flow chart summarizing, a 3D registration algorithm according to an embodiment of the invention is presented in FIG. 6. The details of the steps therein are described below in greater detail. Referring now to the figure, 3D salient region features are detected at step 60 by forming spherical regions. Each resulting salient region feature has the following properties: (1) the center of the region, (2) the scale (radius) of the region, and (3) the salience value of the region.

A uniform distribution of the salient region features across the image space is achieved at step 61 by storing the feature region center points of one set into a kD-tree structure, which allows fast queries on spatial positions. At step 62, the tree is queried for each feature to find the nearest neighbor features. As the regions are described by their scale (radius), those features with lower saliency and a center point that is located within the scale of the current feature are removed at step 63. The resulting subset of clustered salient features is removed from the entire set. No salient region feature is located within the scale of a salient region feature with a higher saliency value. This approach avoids the clustering of salient region features that can arise in image regions with large, locally maximal saliency values. A subsequent image registration based on those features might therefore be biased and result in a wrong solution.

The parameters for the rotation invariance are estimated by a local, intensity driven registration of the 3D salient feature regions. The parameter search space of the local transform is restricted to the rotation parameters. Finding the correspondences between salient region features that are contained in two uncorrelated sets by testing each combination has a high computational complexity. In case of two 3D salient region feature sets, the features are reduced at step 64 to their center points. At step 65, the resulting two point clouds are registered with an iterative closest point (ICP) algorithm that minimizes the mean square error between the sets. The resulting transform is used at step 66 to map the align image feature set into the space of the reference image. The transformed align features can be stored in a kD-tree structure at step 67 in order to allow for fast queries of the nearest N transformed align features with respect to a reference image salient region feature. Based on the assumption that the initial ICP transform results in a robust mapping between the point sets, the tests for hypothesized correspondences can be reduced to the N neighbours for each reference feature instead of the whole set of align image salient feature regions.

In order to achieve a greater accuracy between the salient feature region correspondences, the feature centers are aligned in sub-pixel accuracy at step 68 by a local intensity driven registration between the salient feature regions. In this case, the parameter search space for an expectation maximization optimization process includes the parameters for translation, rotation, and scale.

A principle of salient region features is the expression of a high amount of local unpredictability or signal complexity with respect to a certain scale, where scale refers to the radius of a spherical region around a voxel. This approach distinguishes points of interest on the basis of Shannon's entropy for circular regions of different scales, and assumes that voxels from distinct corresponding anatomical or functional structures have similar saliency values. The local property of the saliency description provides a major benefit to image registration: salient region features that correspond between different images are invariant to gross spatial transforms, even if the images do not overlap.

Observations of SPECT and PET images indicate that the positions of the local saliency maxima may often be locally translated within corresponding structures of interest, compared to the according CT images. This can be addressed by a local rigid registration step that includes sub-pixel accurate translation of the region centers to the corresponding location based on local intensity correlations without deforming the image content. This step preserves the basic assumption of similar saliency values for corresponding features previously mentioned.

The saliency is defined for an image intensity range D as follows:

$$A_D(s_p,x) = H_D(s_p,x) \cdot W_D(s_p,x),$$

where $H_D$ denotes the entropy with respect to the image intensity values $i \in D$ within a spherical neighborhood region $R_s$ around a voxel position x with scale (radius) s:

$$H_D(s,x) = -\int_{R_s} p(i,s,x) \log_2 p(i,s,x) di. \quad (1)$$

Here, p(i, s, x) is the probability density function (PDF) of the descriptor i for the image intensity values contained in $R_s$. $W_D$(s, x) is a measure of the similarity between PDFs with respect to the scale. It grows with increasing dissimilarity of the PDFs:

$$W_D(s, x) = s \int_{R_s} \left| \frac{\partial}{\partial s} p(i, s, x) \right| di.$$

The scale $s_p$ that results in a local peak of $H_D$ at x is given by:

$$s_P = \left\{ s: \frac{\partial H_D(s, x)}{\partial s} = 0, \frac{\partial^2 H_D(s, x)}{\partial^2 s} < 0 \right\}. \quad (2)$$

After solving EQ. (1) for each voxel, the result is two temporary images of the same size as the input image that have to be analysed: one that contains the actual saliency values and another image that contains the scale values from EQ. (2). The locally optimal and most descriptive salient region points are extracted with a region-growing search approach from the saliency image. For a search space reduction, a global saliency threshold a is used as a lower limit. According to an embodiment of the invention, an empirical setting to half the average saliency $$\left( \delta = \frac{1}{2} \overline{A} \right)$$

produced good results for the elimination of insignificant regions.

A nearest point algorithm based on a kD-tree structuring of the region features can determine the positions of local saliency maxima, which results in a list of voxel positions that are ordered according to their saliency values. This approach avoids the clustering of local maxima, which can arise for instance if a global threshold is applied and the features are extracted only according to descending saliency values. The kD-tree is created using the indices of the region centers of the extracted local saliency maxima as leaves. The K nearest neighbors of a specific feature can be efficiently found by a query on the feature's region center index. The distance to the returned features is therefore not in physical but in image index dimensions. The scale parameter can be used as a minimal distance requirement: all returned features with equal or less distance than the scale of the queried feature and with lower saliency are removed from the feature set. This restriction can be applied to the entire set in order to remove clustered regions. If the result set to requires a specific size, the list may be padded with features of lower saliency that fulfill the distance criterion. A feature is kept in the set if its center is not situated within the region of a feature with a higher saliency value. The resulting set of 3D salient region features is uniformly distributed and provides a well conditioned initial set for the subsequent feature correspondence search.

FIGS. 1(a)-(e) depict exemplary sets of salient feature regions. The salient feature regions are indicated by white circles in FIGS. 1(a)-(b). FIG. 1(a) shows the effects of clustering on the set of salient region features, while FIG. 1(b) depicts salient region features selected by an approach according to an embodiment of the invention. FIGS. 1(c), 1(d), and 1(e) depict the most significant 3D salient region features as visualized after the extraction from, respectively, a CT image, a PET image, and an MR image. The salient region features appear as spherical bubbles in FIGS. 1(c)-(e). The volumes are windowed with a specific transfer function to visualize the location of the features in 3D, whereas the extraction itself has been performed on the entire intensity range.

The next step of the 3D registration, referred to as a region component matching step, estimates a set of hypothesized correspondences between features of the two images. Let $I_r$ refer to the reference image and $I_t$ refer to the template image, let $N_r$ be the number of features extracted from $I_r$ and $N_t$ be the number of features from $I_t$. The set of all hypothesized feature correspondences is C={$c_{i,j}$} with $i \in [1, N_r]$, $j \in [1, N_t]$, $|C|=N_r \times N_t$, and with $c_{i,j}=(f_i, f_j)$ being the pair of the features $f_i$ in $I_r$ and $f_j$ in $I_t$.

The parameter set $\Theta$ defines the transform T that aligns the two images and can be estimated based on the translation, scale and rotation invariance properties between $f_i$ and $f_j$. The translational part between $f_i$ and $f_j$ can directly be estimated by: $\hat{\Theta}_{i,j}{}^T = p_i - p_j$, with $p_i$ and $p_j$ being the center positions of the $i^{th}$ reference and $j^{th}$ template features in physical space. For 3D scale invariance in this case is not needed, because for 3D medical images according to embodiments of the invention, the voxel dimensions are provided within the DICOM (Digital Imaging and Communications in Medicine) header. To achieve rotation invariance, the rotation parameters are estimated by a local rigid body registration of the 3D salient feature regions based on their intensity values. The optimization is restricted to the rotational parameter subspace $\Theta^R$ and driven by an intensity similarity measure, the entropy correlation coefficient, which is a specific form of normalized mutual information:

$$ECC(A, B) = 2 - \frac{2H(A, B)}{H(A) + H(B)},$$

where the joint differential entropy H(A,B) can be defined as $$H(A,B) = -\int_{A,B} p(A,B) \log_2 p(A,B) dIdJ,$$

where the domain of the integral is over the regions $R_j$ and $R_j^\Theta$, p(A,B) is a joint probability density of the image intensities in regions A and B, and I and J take on values in the set of possible intensity values in $I_f$ and $I_m$, respectively. This coefficient provides improved robustness to the overlap domain, and some additional advantageous properties: increasing values indicate an increasing dependency between the images and vice versa. The rotation invariance can therefore be formulated as an optimization problem for $\Theta^R$:

$$\hat{\Theta}_{i,j}^R = \underset{\Theta^R}{\mathrm{argmax}} ECC\left(f_i, f_j^{T_{\Theta^R}}\right).$$

A global image similarity measure $L_{global}$ is used to estimate the quality of each of the M pairs:

$$L_{global}(c_{i,j}) = ECC\left(I_r, I_t^{T_{\hat{\Theta}_{i,j}}}\right),$$

where $L_{global}$ is evaluated on the entire overlap domain of the two images instead of just the local feature regions.

Feature pairs that are separated by a large spatial distance are unlikely to be corresponding and can be removed from the set of hypothesized correspondences, which reduces the search space for joint correspondences. The correspondence search space can thus be reduced from combinations of all pairs to combinations only between locally nearest feature neighbors. The neighbor set can be estimated by computing an ICP transformation between the reference and template region feature sets by regarding the sets as point clouds about the region center positions. This ICP algorithm aligns the feature sets with a locally minimal mean-square-error (MSE). The result is used to transform all template features into the coordinate space of the reference image, and store them into a new kD-tree. Then, for each salient feature in the reference image, the approximately nearest neighbors can be determined in a fast search on the tree. The number $N_n$ of transformed template feature nearest neighbors that are combined with each reference feature is a much smaller value than the entire cardinality of the set: $N_n \ll N_t$. This reduces the complexity to $N_r \times N_n$ based on the assumptions that the initial ICP transformation is a good approximation of the actual alignment transformation and that features are less likely to correspond if they are a greater distance apart. The $N_r \times N_n$ feature pairs are tested for their correspondence quality on basis of their translation invariance $\hat{\Theta}_{i,j}^T$, rotation invariance $\hat{\Theta}_{i,j}^R$, and the global image similarity measure $L_{global}(c_{i,j})$ that can be achieved by application of the local feature transform on the entire aligned image.

In experiments conducted according to embodiments of the invention, a neighborhood size of $N_n = (1/10) \% N_t$ has been applied successfully to establish an initial search space for joint correspondences. Furthermore, the hypothesized correspondences are ordered by the global similarity measure $L_{global}$, which results in fewer outliers in the estimated correspondence set.

FIGS. 2(a)-(d) show a slice of a CT volume (left part) that has been translated, rotated and overlaid onto the original slice. A circle represents a salient feature region with a specific scale. The ordering has been performed according to $L_{global}$ and the entire set contained few outliers. For clarity, only the first four correspondences for each approach are shown.

The set of hypothesized correspondences $C = \{c_{i_1, j_1}, \ldots, c_{i_M, j_M}\}$ of size M that is computed in the feature correspondence search of the algorithm is used to estimate a transform T between the two images. This transform is not sufficiently accurate, because its parameters are computed on features that are bound to discrete image grid positions. As mentioned earlier, some feature pairs are not located at the exact corresponding spatial positions. The resulting set may therefore contain outliers and inaccuracies that bias the transform in a negative way. In the following step, $\Theta$ and C are refined in a sub-pixel-accurate iterative process in order to achieve a more accurate alignment.

It is desired to optimize a joint correspondence set $J = \{c_{i_1,j_1}, c_{i_2,j_2}, \ldots, c_{i_n,j_n}\}$, with $J \subset C$ and n[M that contains sub-pixel accurately aligned feature pairs and ideally no outliers. The elements of the optimized joint correspondence set are used as input for an ICP algorithm in order to compute a transform that maximizes the global image similarity:

$$\hat{J} = \arg\max_J L_{global}(J) = \arg\max_J ECC\left(I_r, I_j^{T_j}\right).$$

In order to keep the number of feature pairs low and the registration efficient, an expectation-maximization (EM)-type algorithm is used with a limited number of iteration steps. A transform $T_{J_i}$ is computed from a gradually refined joint correspondence set $J_k \_ J$ at each iteration. $L_{global}$ is used as a convergence criterion for the refinement process. Once a region feature pair has been locally registered with sub-pixel accuracy, following registrations of this specific pair do not enhance the quality of this correspondence and can be neglected. Computation time can therefore be saved by only refining the iteratively added feature pair locations during each iteration step.

A flow chart of an EM-type algorithm for the optimization of both the joint correspondence set and the registration transformation is depicted in FIG. 3. The algorithm is initialized with a joint correspondence set containing the two topmost pairs of C: $J_0 = \{c_{i_1,j_1}, c_{i_2,j_2}\}$. For these initial correspondences, usually the best two from the to ordered set of feature pairs acquired in the previous step can be used. A local rigid registration is used to refine the corresponding salient region features with sub-pixel accuracy. Referring now to the figure, the current set of sub-pixel refined feature correspondences is provided at step 31. At step 32, the estimation step, for all $c_{i,j} \in C \hat{} c_{i,j} \notin J^*$, the global similarity measure $L_{global}(J^* \not\cup c_{i,j})$ is computed. At step 33, the maximization step, the $c_{i,j}$ that maximizes $L_{global}(J^* \cup c_{i,j})$ is selected. Then, at step 34, if the maximal $L_{global}(J^* \cup c_{i,j})[L_{global}(J^*)$, the transformation $T_J^*$ is returned at step 35 and the algorithm terminates. Otherwise, the maximizing feature pair $c_{i,j}$ is registered at step 35 with sub-pixel accuracy with a local rigid transformation to refine the feature centers. The refined feature pair $c_{i,j}^*$ is added at step 37 to the set $J^*$: $J^* \leftarrow J^* \cup c_{i,j}^*$, and the transformation $T_J^*$ is recomputed at step 38. The steps 32-38 are then repeated until convergence.

Algorithms according to embodiments of the invention have been tested on various intra-patient 3D medical images. Measurements have been performed on 11 PET-CT volume pairs that were acquired at different times, 3 CT volumes at different stages of the treatment and 10 SPECT-CT volume pairs from a hybrid scanner. A method according to an embodiment of the invention had to compete with different modalities, noise, varying fields of view and image intensity artifacts in some of the PET-CT pairs, where some slices had different intensity scales that were not corrected during the import. FIGS. 4(a)-(c) are tables displaying overall measured distances for, respectively, the PET-CT, CT-CT, and SPECT-CT volume pairs in x, y and z-direction given in cm, along with the standard deviation. The PET-CT and CT-CT registration quality was assessed by a medical expert by measuring the distances between several points of interest: lung right and left apex, cardiac apex, liver round end, left and right upper and left and right lower renal ends. As the 10 SPECT-CT images have been acquired by a state-of-the-art hybrid scanner, the physician manually de-registered the SPECT images rigidly with variations in x, y and z-direction from 10 to 50 mm and rotations around each axis ranging from 5 to 60 degrees. After registration, several distinguishable landmarks have been chosen by the medical expert on the CT and the SPECT images.

The experiments have been executed on real medical images that contained noise or artifacts due to variations of the intensity scaling between the slices. These issues were not addressed prior to the registration in order to test algorithm according to embodiments of the invention with such data. FIGS. 5(a)-(5) depict three slices from fused registered result images from, respectively, a PET-CT image pair, a CT-CT image pair with intensity artifacts, and a SPECT-CT image pair, acquired using an algorithm according to an embodiment of the invention. Although the latter CT image was acquired with a limited field of view and contains a high amount of noise, the proposed registration resulted in an acceptable accuracy. The remaining mis-registration may be addressed with a non-rigid transform embodiment of the invention.

The results were assessed by a medical expert using dedicated visualization software for the visualization and the measurements. For the evaluation, the medical expert had the choice between using centroids of 3D regions of interest and direct landmark to landmark positions. This task was supported by the integration of fusion visualization into the rendering software together with some additional measurement tools. In the PET-CT case, a higher standard deviation in the z-direction is evident. A reason for this may result from the differences between the acquisition models. The CT image shows one respiration snapshot, whereas the PET image is acquired over several respiration cycles and depicts more or less an average respiratory motion. Due to this motion of the diaphragm, some organs in the abdominal region are lifted and lowered, which causes the greater deviation seen in the data samples. An algorithm according to an embodiment of the invention used for this experiment models only rigid transforms and does not model such local deformations. For the CT-CT data, this effect no longer dominates as the patient ideally inhales similarly in both acquisitions. The SPECT-CT data matches inherently well and a user-defined rigid transformation on the SPECT does not introduce local deformations. Therefore, a good registration result for these cases may well be expected.

In all the results, a specific measurement error is introduced because the medical expert has to specify the location manually by clicking on the locations in the various slice views. In conducted experiments on this type of evaluation, however, the mean difference of specifying distances of points of interests in several measurement steps (both inter- and intra-observer) did not exceed 3 mm.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 7:
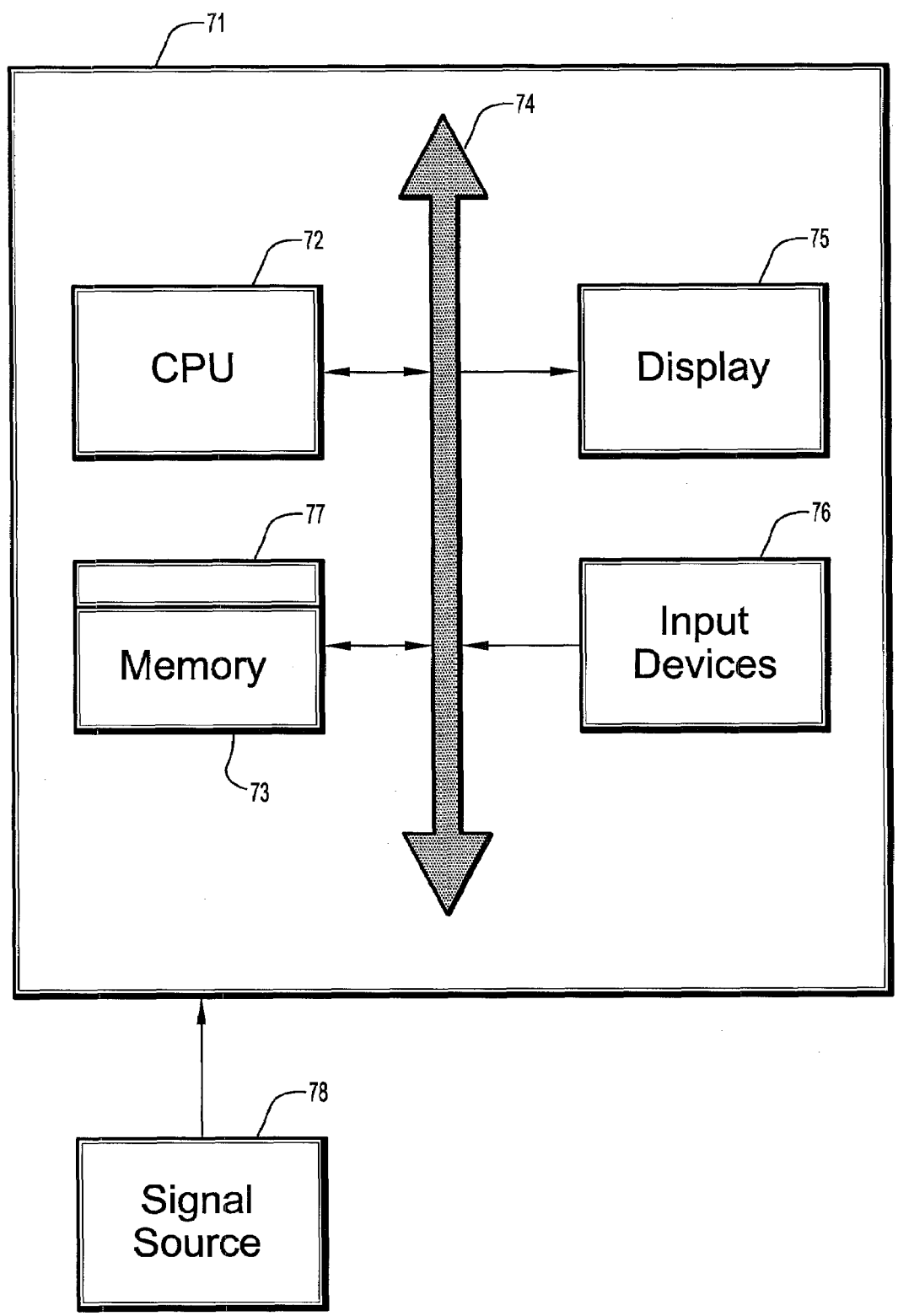
FIG. 7 is a block diagram of an exemplary computer system for implementing a 3D registration process according to an embodiment of the invention.

FIG. 7 is a block diagram of an exemplary computer system for implementing a 3D registration process according to an embodiment of the invention. Referring now to FIG. 7, a computer system 71 for implementing the present invention can comprise, inter alia, a central processing unit (CPU) 72, a memory 73 and an input/output (I/O) interface 74. The computer system 71 is generally coupled through the I/O interface 74 to a display 75 and various input devices 76 such as a mouse and a keyboard. The support circuits can include circuits such as cache, power supplies, clock circuits, and a communication bus. The memory 73 can include random access memory (RAM), read only memory (ROM), disk drive, tape drive, etc., or a combinations thereof. The present invention can be implemented as a routine 77 that is stored in memory 73 and executed by the CPU 72 to process the signal from the signal source 78. As such, the computer system 71 is a general purpose computer system that becomes a specific purpose computer system when executing the routine 77 of the present invention.

The computer system 71 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A method of aligning a pair of images comprising at least one computer implementing the steps of:
providing a pair of images with a first image and a second image, wherein said images comprise a plurality of intensities corresponding to a domain of pixels in a 3-dimensional space,
identifying salient feature regions in both the first image and the second image, wherein each region is associated with a spatial scale;
representing feature regions by a center point of each region;
registering the feature points of one image with the feature points of the other image based on local intensities;
ordering said feature pairs by a similarity measure; and
optimizing a joint correspondence set of feature pairs by refining the center points to sub-pixel accuracy wherein representing salient feature region center points for one image in a KD-tree, querying said KD-tree for each feature to find a set of nearest neighbor features, and removing from said tree those nearest neighbor features with a lower saliency value and that have a center point within the scale of said each feature, wherein a substantially uniform distribution of salient feature regions in said image is achieved.

2. The method of claim 1, wherein said spatial scale is a radius of a sphere comprising said feature region.

3. The method of claim 1, wherein said kD-tree uses image pixel indices of said salient feature region center points as leaves, and wherein a distance from a feature region to a nearest neighbor feature region is in image index units.

4. The method of claim 1, wherein registering the feature points based on local intensities further comprises:
estimating an initial registration using an iterative closest point transformation between said first image and said second image;
transforming all features of said second image into a coordinate space of said first in age;
storing said transformed features in a kD-tree, and querying said tree for each feature in said first image to select those nearest neighbor features in said second image based on a predefined selection criteria; and
testing said selected feature pairs of features in said first image and said second image for translation invariance, rotation invariance, and a global image similarity measure, wherein said selected feature pairs are ordered by their global image similarity measure values.

5. The method of claim 4, wherein said iterative closest point transformation minimizes a mean square error between each set of feature points.

6. The method of claim 4, wherein testing said translation invariance comprises estimating $\hat{\Theta}_{i,j}^T = p_i - p_j$, with $p_i$ and $p_j$ being center position coordinates of the $i^{th}$ first image and $j^{th}$ second image features in physical space.

7. The method of claim 4, wherein testing said rotation invariance comprises estimating $$\hat{\Theta}_{i,j}^R = \underset{\Theta^R}{\operatorname{argmax}} ECC\left(f_i,\ f_j^{T_{\Theta^R}}\right),$$

wherein $(f_i, f_j)$ representing said pair of the features in said first image and said second image, respectively, $$ECC(f_i, f_j) = 2 - \frac{2H(f_i, f_j)}{H(f_i) + H(f_j)},$$

wherein H represents an entropy with respect to image intensity values within a spherical neighborhood feature region $f_s$ around a voxel position x with said spatial scale s defined as $$H_D(s,x) = -\int_R p(i,s,x)\log_2 p(i,s,x)di,$$

wherein p(i, s, x) is a probability density function for the image intensity values i contained in f, wherein $H(f_i, f_j)$ is a joint differential entropy defined as $$H(f_i, f_j) = -\int_{f_i, f_j} p(f_i, f_j)\log_2 p(f_i, f_j)dI dJ,$$

wherein $p(f_i, f_j)$ is a joint probability density of the image intensities in feature regions $f_i$ and $f_j$, and I and J take on values in the set of possible intensity values in said first and second images, respectively.

8. The method of claim 4, wherein testing said global image similarity measure comprises estimating $$L_{global}(c_{i,j}) = ECC\left(I_r,\ I_t^{T_{\Theta_{i,j}}}\right),$$

wherein $I_r$ represent said image, $$I_t^{T_{\Theta_{i,j}}}$$

represents said transformation of said second image onto the coordinate space of said first image, $$ECC\left(I_r, I_t^{T_{\Theta_{i,j}}}\right) = 2 - \frac{2H\left(I_r, I_t^{T_{\Theta_{i,j}}}\right)}{H(I_r) + H\left(I_t^{T_{\Theta_{i,j}}}\right)},$$

wherein H represents an entropy with respect to image intensity values within one of said images around a voxel position x with said spatial scale s defined as $$H(s,x) = -\int_I p(i,s,x)\log_2 p(i,s,x)di,$$

wherein p(i, s, x) is a probability density function for the image intensity values i contained in I, wherein $$H\left(I_r, I_t^{T_{\Theta_{i,j}}}\right)$$

is a joint differential entropy defined as $$H\left(I_r, I_t^{T_{\hat{\Theta}_{i,j}}}\right) = -\int_{I_r, I_t^{T_{\hat{\Theta}_{i,j}}}} p\left(I_r, I_t^{T_{\hat{\Theta}_{i,j}}}\right) \log_2 p\left(I_r, I_t^{T_{\hat{\Theta}_{i,j}}}\right) dI dJ,$$

wherein $$p\left(I_r, I_t^{T_{\hat{\Theta}_{i,j}}}\right)$$

is a joint probability density of the image intensities in images $I_r$ and $$I_t^{T_{\hat{\Theta}_{i,j}}},$$

and I and J take on values in the set of possible intensity values in said first and second images, respectively, and wherein $L_{global}$ is evaluated on the entire overlap domain of said first and second images.

9. The method of claim 1, wherein optimizing a joint correspondence set of feature pairs further comprises
  initializing said joint correspondence set with a feature pair that is most similar according to said similarity measure;
  estimating said similarity measure for a union of said joint correspondence set with each feature pair not already included in said joint correspondence set;
  selecting a feature pair that maximizes the similarity measure of said union, wherein if the similarity measure of the union of said maximizing feature pair with said joint correspondence set is greater than the similarity measure of the joint correspondence set, said maximizing feature pair is registered with a sub-pixel accuracy with a local rigid transformation and is added to said joint correspondence set.

10. The method of claim 9, wherein said similarity measure is maximized by using an iterative closest point procedure to calculate a registration transformation between feature pairs.

11. The method of claim 9, wherein if the similarity measure of the union of said maximizing feature pair with said joint correspondence set is less than or equal to the similarity measure of the joint correspondence set, providing a registration transformation computed from the registration transformation between feature pairs that maximizes said similarity measure.

12. A method of aligning a pair of images comprising at least one computer implementing the steps of:
  providing a pair of images with a first image and a second image, wherein said images comprise a plurality of intensities corresponding to a domain of pixels in a 3-dimensional space,
  identifying salient feature regions in both the first image and the second image, wherein each region is associated with a spatial scale;
  estimating an initial registration using an iterative closest point transformation between said first image and said second image;
  transforming all features of said second image into a coordinate space of said first image;
  storing said transformed features in a kD-tree, and querying said tree for each feature in said first image to select those nearest neighbor features in said second image based on a predefined selection criteria;
  testing said selected feature pairs of features in said first image and said second image for translation invariance, rotation invariance, and a global image similarity measure; and
  ordering said selected feature pairs by their global image similarity measure values.

13. The method of claim 12, further comprising representing feature regions by a center point of each region; storing said feature region center points for one image in a kD-tree, querying said kD-tree for each feature to find a set of nearest neighbor features, and removing from said tree those nearest neighbor features with a lower saliency value and that have a center point within the scale of said each feature, wherein a substantially uniform distribution of salient feature regions in said image is achieved.

14. The method of claim 12, further comprising:
  initializing a joint correspondence set with a feature pair that is most similar according to said similarity measure;
  estimating said similarity measure for a union of said joint correspondence set with each feature pair not already included in said joint correspondence set;
  selecting a feature pair that maximizes the similarity measure of said union, wherein if the similarity measure of the union of said maximizing feature pair with said joint correspondence set is greater than the similarity measure of the joint correspondence set, said maximizing feature pair is registered with a sub-pixel accuracy with a local rigid transformation and is added to said joint correspondence set,
  wherein said global image similarity measure is defined as $$L_{global}(c_{i,j}) = ECC\left(I_r, I_t^{T_{\hat{\Theta}_{i,j}}}\right),$$

wherein $I_r$ represent said first image, $$I_t^{T_{\hat{\Theta}_{i,j}}}$$

represents said transformation of said second image onto the coordinate space of said first image, $$ECC\left(I_r, I_t^{T_{\hat{\Theta}_{i,j}}}\right) = 2 - \frac{2H\left(I_r, I_t^{T_{\hat{\Theta}_{i,j}}}\right)}{H(I_r) + H\left(I_t^{T_{\hat{\Theta}_{i,j}}}\right)},$$

wherein H represents an entropy with respect to image intensity values within one of said images around a voxel position x with said spatial scale s defined as $$H(s,x) = -\int p(i,s,x) \log_2 p(i,s,x) di,$$

wherein p(i, s, x) is a probability density function for the image intensity values i contained in I, wherein $$H\left(I_r, I_t^{T_{\hat{\Theta}_{i,j}}}\right)$$

is a joint differential entropy defined as $$H(I_r, I_t^{T_{\hat{\Theta}_{i,j}}}) = -\int_{I_r, I_t^{T_{\hat{\Theta}_{i,j}}}} p(I_r, I_t^{T_{\hat{\Theta}_{i,j}}}) \log_2 p(I_r, I_t^{T_{\hat{\Theta}_{i,j}}}) dI dJ,$$

wherein $$p(I_r, I_t^{T_{\hat{\Theta}_{i,j}}})$$

is a joint probability density of the image intensities in images $I_r$ and $$I_t^{T_{\hat{\Theta}_{i,j}}},$$

and I and J take on values in the set of possible intensity values in said first and second images, respectively, and wherein $L_{global}$ is evaluated on the entire overlap domain of said first and second images.

15. A program storage device readable by a computer, tangibly embodying a program of instructions executable by the computer to perform the method steps for aligning a pair of images, said method comprising the steps of:
providing a pair of images with a first image and a second image, wherein said images comprise a plurality of intensities corresponding to a domain of pixels in a 3-dimensional space,
identifying salient feature regions in both the first image and the second image, wherein each region is associated with a spatial scale;
representing feature regions by a center point of each region;
registering the feature points of one image with the feature points of the other image based on local intensities;
ordering said feature pairs by a similarity measure; and
optimizing a joint correspondence set of feature pairs by refining the center points to sub-pixel accuracy wherein representing salient feature region center points for one image in a KD-tree, querying said KD-tree for each feature to find a set of nearest neighbor features, and removing from said tree those nearest neighbor features with a lower saliency value and that have a center point within the scale of said each feature, wherein a substantially uniform distribution of salient feature regions in said image is achieved.

16. The computer readable program storage device of claim 15, wherein said spatial scale is a radius of a sphere comprising said feature region.

17. The computer readable program storage device of claim 15, wherein said kD-tree uses image pixel indices of said salient feature region center points as leaves, and wherein a distance from a feature region to a nearest neighbor feature region is in image index units.

18. The computer readable program storage device of claim 15, wherein registering the feature points based on local intensities further comprises:
estimating an initial registration using an iterative closest point transformation between said first image and said second image;
transforming all features of said second image into a coordinate space of said first image;
storing said transformed features in a kD-tree, and querying said tree for each feature in said first image to select those nearest neighbor features in said second image based on a predefined selection criteria; and
testing said selected feature pairs of features in said first image and said second image for translation invariance, rotation invariance, and a global image similarity measure, wherein said selected feature pairs are ordered by their global image similarity measure values.

19. The computer readable program storage device of claim 18, wherein said iterative closest point transformation minimizes a mean square error between each set of feature points.

20. The computer readable program storage device of claim 18, wherein testing said translation invariance comprises estimating $\hat{\Theta}_{i,j}^T = p_i - p_j$, with $p_i$ and $p_j$ being center position coordinates of the $i^{th}$ first image and $j^{th}$ second image features in physical space.

21. The computer readable program storage device of claim 18, wherein testing said rotation invariance comprises estimating $$\hat{\Theta}_{i,j}^R = \arg\max_{\Theta^R} ECC(f_i, f_j^{T_{\Theta^R}}),$$

wherein $(f_i, f_j)$ representing said pair of the features in said first image and said second image, respectively, $$ECC(f_i, f_j) = 2 - \frac{2H(f_i, f_j)}{H(f_i) + H(f_j)},$$

wherein H represents an entropy with respect to image intensity values within a spherical neighborhood feature region $f_s$ around a voxel position x with said spatial scale s defined as $$H_D(s,x) = -\int_R p(i,s,x) \log_2 p(i,s,x) di,$$

wherein $p(i, s, x)$ is a probability density function for the image intensity values i contained in f, wherein $H(f_i, f_j)$ is a joint differential entropy defined as $$H(f_i, f_j) = -\int_{f_i, f_j} p(f_i, f_j) \log_2 p(f_i, f_j) dI dJ,$$

wherein $p(f_i, f_j)$ is a joint probability density of the image intensities in feature regions $f_i$ and $f_j$, and I and J take on values in the set of possible intensity values in said first and second images, respectively.

22. The computer readable program storage device of claim 18, wherein testing said global image similarity measure comprises estimating $$L_{global}(c_{i,j}) = ECC(I_r, I_t^{T_{\hat{\Theta}_{i,j}}}),$$

wherein $I_r$ represent said first image, $$I_t^{T_{\hat{\Theta}_{i,j}}}$$

represents said transformation of said second image onto the coordinate space of said first image, $$ECC\left(I_r, I_t^{T_{\hat{\theta}_{i,j}}}\right) = 2 - \frac{2H\left(I_r, I_t^{T_{\hat{\theta}_{i,j}}}\right)}{H(I_r) + H\left(I_t^{T_{\hat{\theta}_{i,j}}}\right)},$$

wherein H represents an entropy with respect to image intensity values within one of said images around a voxel position x with said spatial scale s defined as $$H(s,x) = -\int p(i,s,x)\log_2 p(i,s,x)di,$$

wherein p(i, s, x) is a probability density function for the image intensity values i contained in I, wherein $$H\left(I_r, I_t^{T_{\hat{\theta}_{i,j}}}\right)$$

is a joint differential entropy defined as $$H\left(I_r, I_t^{T_{\hat{\theta}_{i,j}}}\right) = -\int_{I_r, I_t^{T_{\hat{\theta}_{i,j}}}} p\left(I_r, I_t^{T_{\hat{\theta}_{i,j}}}\right)\log_2 p\left(I_r, I_t^{T_{\hat{\theta}_{i,j}}}\right) dI dJ,$$

wherein $$p\left(I_r, I_t^{T_{\hat{\theta}_{i,j}}}\right)$$

is a joint probability density of the image intensities in images I, and $$I_t^{T_{\hat{\theta}_{i,j}}}$$

and I and J take on values in the set of possible intensity values in said first and second images, respectively, and wherein $L_{global}$ is evaluated on the entire overlap domain of said first and second images.

23. The computer readable program storage device of claim 15, wherein optimizing a joint correspondence set of feature pairs further comprises
   initializing said joint correspondence set with a feature pair that is most similar according to said similarity measure;
   estimating said similarity measure for a union of said joint correspondence set with each feature pair not already included in said joint correspondence set;
   selecting a feature pair that maximizes the similarity measure of said union, wherein if the similarity measure of the union of said maximizing feature pair with said joint correspondence set is greater than the similarity measure of the joint correspondence set, said maximizing feature pair is registered with a sub-pixel accuracy with a local rigid transformation and is added to said joint correspondence set.

24. The computer readable program storage device of claim 23, wherein said similarity measure is maximized by using an iterative closest point procedure to calculate a registration transformation between feature pairs.

25. The computer readable program storage device of claim 23, wherein if the similarity measure of the union of said maximizing feature pair with said joint correspondence set is less than or equal to the similarity measure of the joint correspondence set, providing a registration transformation computed from the registration transformation between feature pairs that maximizes said similarity measure.

* * * * *